UNITED STATES PATENT OFFICE.

HENRY REDLICH, OF CHICAGO, ILLINOIS.

IMPROVED ARTIFICIAL FUEL.

Specification forming part of Letters Patent No. 48,439, dated June 27, 1865.

*To all whom it may concern:*

Be it known that I, HENRY REDLICH, of Chicago, Cook county, State of Illinois, have invented a new and useful Improvement in Aggregating Coal-Dust, Sawdust, &c.; and I do hereby declare that the following is a full, clear, and exact description thereof, which will enable others skilled in the art to fully understand and use the same.

This invention relates to an improved method of aggregating coal-dust or waste coal, and also sawdust and other similar combustibles, by mixing them with a certain percentage of cow-manure, with or without blood, and compressing the mixture so as to drive out all moisture and to produce cakes of the requisite form and consistency.

The proportion in which I mix the ingredients of my composition together is about as follows: hard-coal dust, four parts, by weight; fresh cow-dung, three parts, which leaves, after dripping and pressing, only six parts, because all the moisture contained in the cow-dung is expelled. Or, instead of the above, I have used with advantage the following proportion: hard-coal dust, four parts; fresh cow-dung, three parts; blood, one part, which, when mixed, pressed, and dried, leaves only six parts, because all watery matter of the cow-manure and blood dries out.

If I have soft-coal dust instead of hard-coal dust, the proportion is slightly changed; and I have used with good result the following proportion: soft-coal dust, four parts; cow-dung, two parts, which I mix, as above, in a mortar or any other suitable reservoir, and press and dry.

By this combination I am enabled to utilize coal-dust, which can be had in coal-mines and coal-yards at a trifling expense, and which is generally considered mere waste, and the fuel produced according to my invention gives out a good heat and leaves comparatively little ashes. If made in large scale, it could be sold from one-third to one-fourth of the price of the same kind of coal, because made of the useless coal-dust, which is considered worthless, and can be got for a mere trifle. Cow-manure also can be procured everywhere at a small expense, and, it being combustible and not a good conductor of heat, it promotes the burning of the coal. Furthermore, by this branch of industry a large portion of coal will be used up, and the health of the neighborhood will be improved.

I claim as new and desire to secure by Letters Patent—

The within-described combination of the ingredients above specified, and mixed together substantially in the manner and about in the proportion set forth.

HENRY REDLICH.

Witnesses:
J. M. MOORE,
HENRY NOTT.